(12) United States Patent
Neuteboom et al.

(10) Patent No.: US 9,458,266 B2
(45) Date of Patent: Oct. 4, 2016

(54) HIGH PRESSURE POLYMERISATION PROCESS FOR THE PREPARATION OF POLYETHYLENE

(71) Applicant: Saudi Basic Industries Corporation, Riyadh (SA)

(72) Inventors: Peter Neuteboom, Geleen (SA); Jan Nicolaas Eddy Duchateau, Geleen (NL); Diego Mauricio Castaneda Zuniga, Geleen (NL)

(73) Assignee: SAUDI BASIC INDUSTRIES CORPORATION, Riyadh (SA)

(*) Notice: Subject to any disclaimer, the term of this patent is extended or adjusted under 35 U.S.C. 154(b) by 0 days.

(21) Appl. No.: 14/780,150

(22) PCT Filed: Mar. 27, 2014

(86) PCT No.: PCT/EP2014/056116
§ 371 (c)(1),
(2) Date: Sep. 25, 2015

(87) PCT Pub. No.: WO2014/154781
PCT Pub. Date: Oct. 2, 2014

(65) Prior Publication Data
US 2016/0039953 A1    Feb. 11, 2016

(30) Foreign Application Priority Data

Mar. 28, 2013   (EP) .................................. 13001628

(51) Int. Cl.
*C08F 4/70*    (2006.01)
*C08F 110/02*  (2006.01)
*C08F 2/42*    (2006.01)
*C08F 2/40*    (2006.01)
*C08F 2/38*    (2006.01)
*C08F 2/02*    (2006.01)

(52) U.S. Cl.
CPC ............... *C08F 110/02* (2013.01); *C08F 2/02* (2013.01); *C08F 2/38* (2013.01); *C08F 2/40* (2013.01); *C08F 2/42* (2013.01); *C08F 4/7081* (2013.01)

(58) Field of Classification Search
CPC ............. C08F 2/02; C08F 4/28; C08F 4/32; C08F 4/34; C08F 2/38; C08F 2/40; C08F 2/42; C08F 10/02; C08F 4/7081
See application file for complete search history.

(56) References Cited

U.S. PATENT DOCUMENTS

| | | | |
|---|---|---|---|
| 2,971,952 A | 2/1961 | Batty et al. | |
| 3,311,596 A | 3/1967 | Berding et al. | |
| 4,382,132 A * | 5/1983 | Kelley | C08F 110/02 526/135 |
| 4,680,352 A * | 7/1987 | Janowicz | C08F 2/38 526/120 |
| 4,694,054 A * | 9/1987 | Janowicz | C08F 2/38 526/120 |
| 4,886,861 A * | 12/1989 | Janowicz | C08F 2/38 526/145 |
| 5,770,665 A * | 6/1998 | Haddleton | C08F 2/38 526/131 |
| 5,962,609 A * | 10/1999 | Haddleton | C08F 2/38 526/131 |
| 6,624,261 B1 * | 9/2003 | Moad | C08F 2/38 526/140 |
| 7,714,084 B2 * | 5/2010 | Nikiforov | C07F 5/022 502/162 |
| 9,202,014 B2 * | 12/2015 | Tchir | C08F 10/02 |

FOREIGN PATENT DOCUMENTS

| | | |
|---|---|---|
| FR | 1360001 A | 4/1964 |
| GB | 807112 | 1/1959 |
| JP | 2281046 | 11/1990 |

OTHER PUBLICATIONS

International Search Report and Written Opinion for PCT/EP2014/056116 mailed Jun. 23, 2014, 8 pages.

* cited by examiner

*Primary Examiner* — Rip A Lee
(74) *Attorney, Agent, or Firm* — Cantor Colburn LLP

(57) ABSTRACT

The invention relates to a high pressure polymerisation process for the preparation of the polyethylene wherein the polymerisation process takes place in the presence of a cobalt containing complex. The cobalt containing complex may be a complex according to Formula (I): Formula (I) wherein $y^1$, $y^2$, $y^3$ and $y^4$ may, independently of one another be the same or different, H, ($C_1C_{20}$) alkyl, ($C_5$-$C_{20}$) cycloalkyl, ($C_6$-$C_{10}$) aryl radical, phenyl or hydroxy-phenyl.

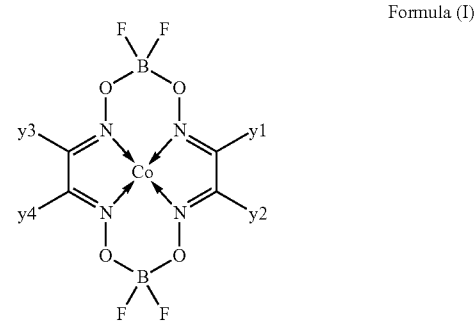

Formula (I)

5 Claims, No Drawings

HIGH PRESSURE POLYMERISATION PROCESS FOR THE PREPARATION OF POLYETHYLENE

This application is a national stage application of PCT/EP2014/056116 filed Mar. 27, 2014, which claims priority to European Application 13001628.0 filed Mar. 28, 2013, both of which are hereby incorporated by reference in their entirety.

The invention relates a high pressure polymerisation process for the preparation of the polyethylene.

The high pressure polymerisation process of ethylene is well known and for example disclosed by Andrew Peacock (Plastics Engineering 57; 43-66, 2000). Peacock describes the free radical chemical processes, the high pressure production facilities and the high pressure reaction conditions. The process may take place in a tubular reactor or in an autoclave reactor. Reactors can take one of two forms being either an autoclave, with a height-to-diameter ratio in the region of 5-20, or a tubular reactor, with a length-to-diameter ratio from a few hundred up to tens of thousands. These two divergent reactor geometries pose uniquely different chemical engineering problems requiring disparate control conditions. Tubular and autoclave reactors with their disparate profiles require different methods of temperature control. The ethylene entering an autoclave reactor is precooled, so that it can absorb some of the heat generated by the polymerization reaction already in progress. As the temperature of the incoming stream rises, the initiator decomposes. The surface-to-volume ratio of autoclave reactors is so low that external cooling has little effect. Autoclave reactors are stirred vigorously to reduce the likelihood of localized hot spots. Typical average residence times of ethylene within an autoclave are in the region of 3-5 min as unreacted ethylene exits the autoclave with the polyethylene product it carries away excess heat. In a tubular reactor the incoming ethylene is preheated to decompose the initiator, thereby starting polymerization. Once the reaction is under way, the excess heat is removed by external cooling, which is effective given the narrow diameter of the tube. Generally, the residence time of reactants within a tubular reactor is between 30 and 300 seconds. The difference between the essential lack of mixing in the tubular reactor and the high levels of mixing in the autoclave presents distinct opportunities for the control of reaction conditions and hence the molecular structure of the products. During the polyethylene high-pressure process polyethylene is prepared by radical polymerisation in supercritical ethylene.

The tubular polymerisation polymerisation can be started by metering an initiator such as for example an organic peroxide, azodicarboxylic acid ester, azodicarboxylic acid dinitrile and hydrocarbons that decompose into radicals. Oxygen and air are also are suitable to serve as an initiator. The ethylene, which is compressed to the desired pressure, flows through the reactor tube which is provided on the outside with a jacket through which cooling water flows in order to remove the developed heat of reaction via the wall. This reactor has a length between for example 1000 meters and 3000 meters and an internal diameter between for example 0.01 meters and 0.10 meter. The incoming ethylene is first heated to the decomposition temperature of the initiator, whereupon an initiator solution is metered and the polymerisation subsequently starts. The desired peak temperature is attained by controlling the quantity of initiator. Thereafter the mixture cools and, after the temperature has dropped to a sufficiently low level, initiator is metered one or more times again via one of the initiator injection points. The amount of injection points may range for example between 2 and 5. Downstream from the reactor the obtained product is transported to the product silos after for example extrusion, separation and drying.

Preferably the temperature in the reaction zone of the high pressure reactor ranges between 150° C. and 330° C. Generally the reactor inlet pressure lies between 150 MPa and 400 Mpa where reactor inlet pressure refers to the (total) pressure at which the feed stream leaves the compressor enters the reactor.

The high pressure reactors are suitable both for the preparation of a homopolymer of ethylene and for the preparation of a copolymer of ethylene and one or more monomers copolymerisable therewith. Suitable comonomers are for example α-olefins with 2-12 C atoms, α, β ethylenically unsaturated carboxylic acid, α, β ethylenically unsaturated $C_{4-15}$ carboxylic acid esters or their anhydrides. Examples of suitable α-olefins to be applied as a comonomer are ethylene, propylene and/or butene. Examples of suitable α, β ethylenically unsaturated carboxylic acids are maleic acid, fumaric acid, itaconic acid, acrylic acid, methacrylic acid and/or crotonic acid. Examples of α,β ethylenically unsaturated $C_{4-15}$ carboxylic acid esters or their anhydrides are methylmethacrylate, ethylacrylate, n-butyl methacrylate, vinyl acetate, methacrylic acid anhydride, maleic acid anhydride, 1,4-butanedioldimethacrylate, hexanediol dimethacrylate, 1,3-butylene glycoldimethacrylate, ethylene glycol dimethacrylate, dodecanediol dimethacrylate, trimethylol propane trimethacrylate, trimethacrylate ester and/or itaconic acid anhydride. The quantity of comonomer in the polymer is dependent on the desired application and is customarily lower than 20 wt %.

Suitable organic peroxides are for example peroxyester, peroxyketone, peroxyketal and peroxycarbonate such as di-2-ethylhexyl-peroxydicarbonate, diacetylperoxydicarbonate, dicyclohexyl-peroxydicarbonate, tert.-amylperpivalate, cumyl perneodecanoate, tert.-butylperneodecanoate, tert.-butyl perpivalate, tert.-butylpermaleinate, tert.-butylperisononanoate, tert.-butylperbenzoate, tert,-butylperoxy-2-ethylhexanoate. Tert.-butyl-hydroperoxide, d-tert. Butyl peroxide, di-isopropylbenzol hydroperoxide, di-isononanoyl peroxide, didecanoylperoxide, cumol hydroperoxide, methyl isobutyl ketone hydroperoxide, 2.2-bis-(tert.-butylperoxy)-butane and/or 3.4-dimethyl-3.4-diphenylhexane. Also bifunctional peroxides including for example 2,5-dimethyl-2,5-di-tertiair-butylperoxyhexane, 2,5-dimethyl-2,5-tertiair-peroxyhexyne-3 3,6,9-triethyl-3,6,9-trimethyl-1,4,7-triperoxononane, 3,3,6,6,9,9-hexamethyl-1,2,4,5-tetraoxacyclononane, n-ethyl-4,4-di-tertiair-butylperoxyvalerate, 1,1-di-tertiair-butylperoxy-3,3,5-trimethylcyclohexane, ethyl-3,3-di-tertiair-butylperoxybutyrate 1,1-di-tertiair-butylperoxycyclohexane, 2,2-di-tertiair-butylperoxybutane ethyl-3,3-di-tertair-amyl peroxy butyrate, 2,2-di-4,4-di-tertiair-butylperoxycyclohexyl propane, methyl-isobutyl-peroxide, 1,1-di-tertiair-amylperoxycyclohexane, 1,1-di-tertiair-butylperoxycyclohexane, 2,5-di-methyl-2,5-di-2-ethyl-hexanoylperoxyhexane and/or 1,4-di-tertiair-butylperoxycarbocyclohexane may be applied.

The reaction can be optimally controlled by metering different initiators or mixtures of initiators at the different initiator injection points. The initiator concentration generally lies between 0.5 ppm and 100 ppm relative to the quantity of monomer.

During the polymerisation it is possible to add for example inhibitors, scavengers and/or a chain regulator. Suitable chain regulators include an aldehyde for example propione aldehyde, a ketone or an aliphatic hydrocarbon for example propane and propylene. Chain transfer is the process by which the growth of a polyethylene chain is terminated in such a way that the free radical associated with it transfers to another molecule on which further chain growth occurs, i.e., the number of free radicals and growing chains remains constant. The molecule to which the free radical is transferred can be either ethylene or a deliberately added chain transfer agent (CTA) such as a solvent molecule. The net effect of adding a chain transfer agent is to reduce the average molecular weight of the resin. As a general rule, chain transfer is controlled by altering reaction conditions rather than by the addition of chain transfer agents.

Generally the density of LDPE ranges between 915 kg/m³ and 930 kg/m³ (according to ISO1183) and the melt index ranges between 0.10 dg/minute and 100 dg/minute (according to ASTM 1238). LDPE can be used alone, blended or coextruded for a variety of packaging, construction, agricultural, industrial and consumer applications.

It is a disadvantage of LDPE obtained with a high pressure polymerisation process that the density is relatively low when specific applications are intended.

It is the object of the present invention to provide a high pressure polymerisation process for the preparation of polyethylene homopolymer or copolymer having a density higher than 930 kg/m³.

The invention is characterized in that the high pressure polymerisation process for the preparation of the polyethylene takes place at temperatures in the reaction zone of the high pressure reactor ranges between 150° C. and 330° C. and reactor inlet pressures between 150 Mpa and 400 Mpa in the presence of a cobalt containing complex.

The complex is a coordination complex or metal complex. The coordination complex or metal complex is a molecular entity formed by loose association involving two or more component molecular entities (ionic or uncharged) or the corresponding chemical species. The complex consists of a metal ion center that is surrounded by organic or inorganic molecules which are called ligands. The components are usually bonded by weak electrostatic bonds rather than covalent bonds. The metal is preferably a metal ion from the group of the transition metals. A preferred metal is cobalt.

The cobalt complex acts as a catalytic chain transfer agent. By using the cobalt complex in the high pressure polymerization process according to the invention it is possible to obtain polyethylene having a density of 930-985 kg/m³ (according to ISO1183) preferably higher than 935 kg/m³ instead of densities lower than 930 kg/m³.

According to a preferred embodiment of the invention the cobalt containing complex is a complex according to Formula (I):

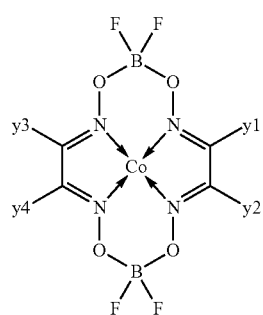

Formula (I)

wherein
$y^1$, $y^{2y}$, $y^3$ and $y^4$ may, independently of one another be the same or different, H, ($C_1$-$C_{20}$) alkyl, ($C_5$-$C_{20}$) cycloalkyl, ($C_6$-$C_{10}$) aryl radical, phenyl or hydroxyl-phenyl.

According to a preferred embodiment of the invention $y^1$, $y^2$, $y^3$ and $y^4$ may, independently of one another be the same or different ($C_1$-$C_{20}$) alkyl.

According to a preferred embodiment of the invention $y^1$, $y^2$, $y^3$ and $y^4$ may, independently of one another be the same or different ($C_2$-$C_8$) alkyl.

By using this cobalt complex according to the invention as chain transfer agent in combination with any peroxide polyethylene homo polymer or copolymer having a density higher than 930 kg/m³ via a high pressure polymerization process is obtained.

It is very advantageous that a high density polymer with low chain branching is obtained.

Another advantage is that the molecular weight distribution MWD or Mw/Mn is very narrow. Mw/Mn is lower than 10 and higher than 1.5.

The amount of the cobalt complex used in the step of contacting the cobalt containing complex with ethylene and optionally one or more alpha-olefin comonomers applied during the polymerization process ranges between 0.5 and 100 mol ppm relative to the ethylene monomer.

Preferably the amount of the cobalt complex applied during the polymerization process ranges between 0.5 and 20 mol ppm relative to the ethylene monomer.

According to a further preferred embodiment the pressure in the high pressure polymerization process ranges between 200 Mpa and 400 Mpa.

Preferably the polymerization takes place in a tubular reactor.

It is an advantage of the present invention that polyethylene having a density in the range 930-985 kg/m³ and Mw/Mn lower than 10 can be obtained by a high pressure polymerisation process as described above. According to a further preferred embodiment the density is in the range 940-985 kg/m³.

GB 807112 discloses a process at a temperature lower than 100 degrees Celsius for the production of ethylene-organic vinylester copolymers in an aqueous dispersion. GB 807112 is not directed to the preparation of polyethylene by free radical polymerisation in supercritical ethylene at higher temperatures. Furthermore GB 807112 uses cobalt complex salts. The present invention is not directed to salts.

U.S. Pat. No. 2,971,952 discloses a process for the polymerization of ethylene in the presence of hyponitrite. As an example of a catalyst isobutoxymethyl hyponitrite solution is disclosed. This catalyst is made from cobalt hyponitrite. U.S. Pat. No. 2,971,952 does not disclose a polymerisation process in the presence of a cobalt containing complex.

FR 1360001 discloses the polymerization of an alpha olefin with a catalyst consisting of a metal chelate compound of a mono- or tri- or polyvalent metal and a compound capable of forming a chelate complex at a temperature less than 150 degrees Celcius. FR 1360001 discloses the polymerization of ethylene in the presence of a cobalt acetylacetonate at a temperature of 140 degrees Celcius with a very long residence time of 8 hours and a pressure of 100 MPa.

The invention will be elucidated by means of the following non-restrictive examples.

EXAMPLES I-II AND COMPARATIVE EXAMPLES A-B

Ethylene is polymerized in an autoclave reactor at a temperature as indicated in Table 1 and a pressure of 150

MPa (1500 bar) with AIBN as initiator. In Examples I and II the cobalt complex according to formula (I) wherein $y^1$, $y^2$, $y^3$ and $y^4$ are $C_4$ alkyl is added in amounts of 5.3 and 0.7 mol ppm. Comparative Examples A-B are the same as the Examples I-II with the difference that no cobalt complex is added.

The results in Table 1 show that the use of the Co complex results in a density of 944 and 959 kg/m³. MFI is measured at 190 degrees Celcius, under a continuous load of 2.19 kg.

TABLE 1

|  |  | Example | | | |
|---|---|---|---|---|---|
|  |  | I | A | II | B |
| Co | [molppm] | 5.3 |  | 0.7 |  |
| T | [° C.] | 146 | 146 | 136 | 136 |
| Conv | % | 4.3 | 8.7 | 16.4 | 5.7 |
| Density | [kg/m³] | 944 | 928 | 959 | 931 |
| MFI | g/10 min | 12.7 | 1.86 | 11.3 | 1.06 |

EXAMPLES III-IV

Example I was repeated with the exception that methyl-methacrylate is applied as comonomer. The Co complex concentration was set to 1 mol ppm. The results in Table 2 show that the use of the Co complex results in densities of 966 and 980 kg/m³.

TABLE 2

|  |  | Example | |
|---|---|---|---|
|  |  | III | IV |
| Co | [molppm] | 1 | 1 |
| MMA | [mol %] | 1.6 | 1.3 |
| T | [° C.] | 146 | 146 |
| Conv | % | 1.4 | 2.3 |
| Density | [kg/m³] | 966 | 980 |
| nCH3 | /1000C | 48.76 | 34.98 |

EXAMPLES V-VI AND COMPARATIVE EXAMPLE C

Ethylene is polymerized in an autoclave reactor at a temperature as indicated in Table 3 and a pressure of 200 MPa (2000 bar) with tert. Butyl peroxy-2-ethylhexanoate (Luperox 26) as initiator.

In Examples V and VI the cobalt complex according to formula (I) wherein $y^1$, $y^2$, $y^3$ and $y^4$ are $C_4$ alkyl is added in amounts of 6 and 2 mol ppm.

Comparative Example was performed without cobalt complex.

The results in Table 3 show that the use of the Co complex results in a density higher than 930 kg/m³ and a very narrow MWD less than 6.

The MWD was measured using a Polymer Laboratories PL-GPC220 (System ID: C8) equipped with a Polymer Laboratories PL BV-400 viscometer; Refractive index detector; Polymer Char IRS infrared detector. The column set used are three Polymer Laboratories 13 µm PLgel Olexis, 300×7.5 mm.

TABLE 3

|  |  | Example | | |
|---|---|---|---|---|
|  |  | V | VI | C |
| Co Complex | [molppm] | 6 | 2 | 0 |
| Temperature | [° C.] | 200 | 217 | 221 |
| Pressure | [Mpa] | 200 | 200 | 200 |
| Conversion | [%] | 7.7 | 10.4 | 10.3 |
| MFI | [dg/min] | 87 | 77 | 102 |
| density | [kg/m3] | 935 | 932 | 923 |
| Mn | [kg/mol] | 12 | 10 | 9.3 |
| Mw | [kg/mol] | 46 | 59 | 155 |
| Mw/Mn | — | 3.8 | 5.9 | 16.7 |
| Mz | [kg/mol] | 150 | 270 | 3500 |
| Mz/Mw | — | 3.3 | 4.6 | 22.5 |

The invention claimed is:

1. A high pressure polymerisation process for the preparation of polyethylene by free radical polymerisation in supercritical ethylene in a high pressure reactor comprising a reactor inlet and a reaction zone, the process comprising:
polymerising the ethylene at a temperature in the reaction zone of the high pressure reactor between 150° C. and 330° C. and at a reactor inlet pressure between 150 MPa and 400 MPa in the presence of a cobalt containing complex according to Formula (I):

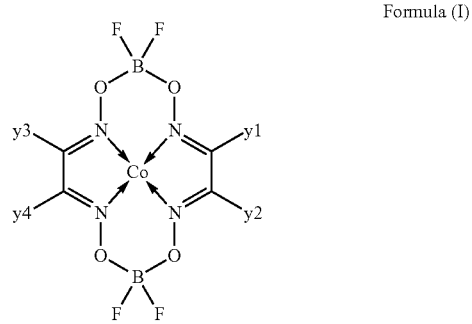

Formula (I)

wherein
$y^1$, $y^2$, $y^3$ and $y^4$, independently of one another, are the same or different, and are selected from H, ($C_1$-$C_{20}$) alkyl, ($C_5$-$C_{20}$) cycloalkyl, ($C_6$-$C_{10}$) aryl radical, phenyl, or hydroxy-phenyl.

2. A process according to claim 1, wherein $y^1$, $y^2$, $y^3$ and $y^4$, independently of one another, are the same or different ($C_1$-$C_{20}$) alkyl.

3. A process according to claim 1, wherein $y^1$, $y^2$, $y^3$ and $y^4$, independently of one another, are the same or different ($C_2$-$C_8$) alkyl.

4. A process according to claim 1, wherein the polymerising takes place in a tubular reactor.

5. A process according to claim 2, wherein the polymerising takes place in a tubular reactor.

* * * * *